United States Patent Office 2,741,476
Patented Apr. 10, 1956

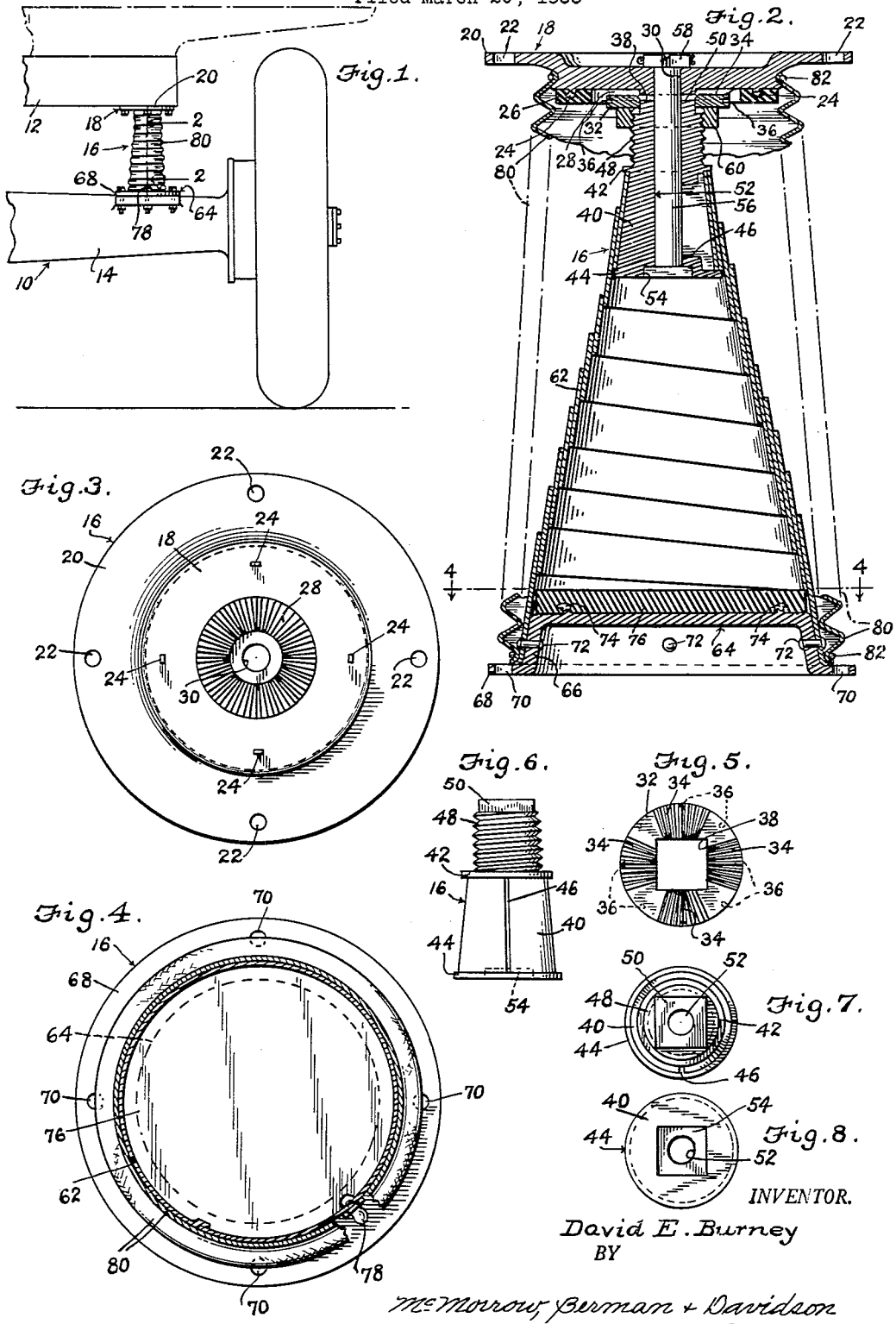

2,741,476

SHOCK-ABSORBENT SPRING ASSEMBLY

David E. Burney, Mammoth, Ariz.

Application March 20, 1953, Serial No. 343,710

5 Claims. (Cl. 267—62)

This invention relates to spring assemblies, and more particularly, has reference to an assembly of the type stated that includes a volute spring formed from a length of flat bar material having overlapped convolutions, the assembly constituting the present invention having means at one end of the spring for applying torque thereto to adjust the spring tension, said means being lockable in selected positions to which the spring is adjustably tensioned.

The assembly constituting the present invention can be used advantageously on vehicles of various types, including automobiles, trucks, airplanes, etc. However, the assembly is so designed as to not require that it be necessarily limited to such use, and I believe that the spring can be readily adapted for mounting on stationary machines and other structures in which shock-absorbing means is desirable.

It is one important object to provide an improved means, in an assembly of the character referred to, for connecting the volute spring at its opposite ends to spaced anchor plates, which means will be effective to permit rotation of one end of the spring relative to the anchor plate adjacent to said end, for adjusting the spring tension, said adjacent anchor plate and said means being interengageable in selected positions to which the tension adjusting means is rotated relative to the plate.

Another object of importance is to provide, in a spring tension adjusting means of the character stated, a construction which will permit fine tension adjustments to be made, within a wide range of said adjustments to tension the spring accurately according to the load to be supported thereby.

Yet another object is to provide a device of the character stated which will be so designed as to eliminate the necessity of using shock absorbers in conjunction with the spring, the spring being so formed as to have a highly desirable shock absorption characteristic.

Yet another object is to provide a spring assembly as stated which will have a full, free springing action, and which will at the same time be completely silent in operation.

Yet another object is to provide, in a spring assembly as described, cushioning pads carried by the respective anchor plates, which pads will be so arranged as to engage selected convolutions of the spring when the spring is compressed axially to an excessive extent.

Other objects will appear from the following description, the claims appended thereto, and from the annexed drawing, in which like reference characters designate like parts throughout the several views, and wherein:

Figure 1 is a fragmentary elevational view of a vehicle equipped with a spring assembly formed in accordance with the present invention, said assembly being shown in side elevation;

Figure 2 is an enlarged longitudinal sectional view through the assembly per se taken on line 2—2 of Figure 1;

Figure 3 is a bottom plan view of the upper anchor plate;

Figure 4 is a transverse sectional view taken on line 4—4 of Figure 2;

Figure 5 is a top plan view of a toothed lock element carried by the spring;

Figure 6 is a side elevational view of a plug-like body carried by the spring and supporting said element;

Figure 7 is a top plan view of the plug-like body; and

Figure 8 is a bottom plan view of said body.

The spring assembly constituting the present invention has been illustrated, by way of example, as being mounted upon a vehicle 10. However, as will be apparent from the description to be provided hereinafter, the spring assembly can be used on any structure where springing and shock-absorption is needed.

In any event, the vehicle 10 includes a frame 12 and an axle housing 14, the spring assembly 16 constituting the present invention being interposed between, and being anchored at its opposite ends to, said frame and axle housing.

The spring assembly 16 includes a generally flat, circular, upper anchor plate 18 integrally formed with an upwardly offset, outwardly directed peripheral flange 20 having circumferentially spaced openings 22 adapted to receive bolts or equivalent connecting elements, whereby the upper anchor plate can be fixedly secured to the frame 12.

Formed upon the underside of the upper anchor plate, and spaced inwardly from the peripheral flange 20, is a circumferential series of equidistantly spaced, depending lugs 24, engageable in the upper surface of an annular cushion ring 26 of soft rubber or other resilient material. The ring 26 is thus secured to the underside of the anchor plate, in concentric relation to said plate.

Inwardly of the cushion ring 26, the underside of the upper anchor plate has an annular series of downwardly facing, radially extending clutch teeth 28 (Figure 3), said series being spaced outwardly a short distance from a smooth walled center opening 30 formed in the plate.

Disposed below and in closely spaced relation to the clutch teeth 28 is a flat, circular, locking element 32 (Figure 5). Element 32 is arranged concentrically to the upper anchor plate and the annular series of clutch teeth 28, and is formed, throughout its periphery, with equidistantly spaced recesses 36. These are adapted for selective engagement therein of the spaced teeth of a spanner wrench or similar tool, not shown, and it will be understood that when a wrench of this type is so engaged with the element 32, said element can be rotated to selected positions relative to the upper anchor plate.

In the center of the element 32, I form a large, non-circular opening 38, said opening being square in the present instance. It will be understood, however, that the opening could be of some other shape, such as an elliptical or slot-like shape.

In the upper face of the element 32, I form spaced series of locking grooves, defining teeth therebetween, the teeth of element 32 radiating outwardly from the center thereof, as best shown in Figure 5. It will thus be understood that the element 32, having locking teeth 34, will be interengaged with the upper anchor plate, when said element is shifted toward said plate after being rotated to a selected extent.

The element 32 is supported upon the upper end of a plug-like body 40. As will be noted from Figures 2 and 6, the body can be integrally formed with a frusto-conical lower end portion, said lower end portion having, at opposite ends thereof, circumferential shoulders 42, 44 respectively. In the frusto-conical portion of body 40, a longitudinal slot 46 is formed, said slot opening inwardly from the surface of the frusto-conical portion, and being disposed radially of said portion.

Integrally formed upon the upper end of the frusto-conical portion is a cylindrical, threaded upper end portion 48, and at the upper end of said portion 48 a non-circular head 50 is formed, which head is shaped complementarily to the opening 38 of element 32. Element 32 thus can be supported upon the head 50, and on rotation of the element, the plug-like body 40 will be rotated therewith. At the same time, the element 32 is shiftable longitudinally of body 40 upon the head 50, toward and away from the upper anchor plate.

Extending from end to end of the body 40 is a smooth walled axial bore 52, said bore being in communication, at its lower end, with a recess 54 of non-circular shape, which recess is adapted to receive the complementarily formed head of a connecting bolt 56. Bolt 56 extends through the bore 52, and that end of the bolt remote from the head thereof is extended through opening 30 of the upper anchor plate. A nut 58 is threaded upon the end of the bolt that extends through opening 30, and as shown in Figure 2, the nut 58 and the shank of the bolt can be locked against rotation relative to one another by means of a cotter key. Nut 58 and bolt 56 have a fixed setting that allows for adjustment of the clutch teeth hereinbefore described.

From the above, it will be seen that the plug-like body 40 is rotatably mounted upon, and depends from, the upper anchor plate. The body 40 is rotatably adjusted upon the upper plate, accordingly, by rotation of the element 32. After body 40 has been rotated to a selected extent, a nut 60, threaded upon the upper end portion of body 40, can be tightened against the element 32, thereby shifting said element into engagement with the clutch teeth 28 of the upper anchor plate. In this way, the body 40 will be locked in selected positions to which it is rotatably adjusted.

A lower anchor plate has been designated by the reference numeral 64, and is formed with a depending peripheral flange 66 merging into an outwardly directed, circumferentially extending lip 68 having spaced bolt-receiving openings 70. The openings 70 are adapted to receive connecting bolts or the like, whereby the lower anchor plate can be fixedly secured to the axle housing 14.

Rivets 72 are spaced circumferentially about, and extend through the depending flange 66 of the lower anchor plate, and serve to fixedly connect the lower end of a spring 62 to said lower anchor plate. The spring 62 will be described in detail hereinafter.

Formed on the upper surface of the lower anchor plate is a circumferential series of upwardly extending lugs 74 embedded in a circular, flat cushion pad 76 of rubber or the like.

As will be seen from Figure 2, spring 62 is of the volute type, and is formed from a length of flat bar material coiled in either a clockwise or counterclockwise direction from the small end of the spring. At the small end of the spring, the length of bar material from which the spring is formed is turned inwardly and engaged in the slot 46 of the body 40, thereby to anchor the spring at its small end to said body. The frusto-conical lower end portion of the body 40, as will be noted from Figure 2, is so shaped to permit the uppermost, smallest coil of the spring to be circumposed thereabout, said uppermost coil being engaged against movement longitudinally of the body 40 by the shoulders 42, 44.

It will further be seen from Figure 2 that the several coils of the spring 62 are overlapped, throughout the length of the spring, the lowermost coil of the spring being fixedly secured to the lower anchor plate 64 by means of the rivets 72.

A grease fitting 78 of conventional design (see Figure 4) is provided in the depending flange 66, for lubrication purposes, and ordinarily, when the spring is mounted in place, an initial lubrication of the same will be sufficient for an indefinite period of time.

It is preferred that the spring be protectively housed in a bellows-like boot 80, the lower end of which is clamped to the lower anchor plate by means of a wire band 82, the upper end of said boot being similarly connected by a like band to the upper anchor plate.

Considering the functional characteristics of the invention, it will be readily seen that after the anchor plates have been fixedly secured to the structural members between which the spring is to extend, the nut 60 can be backed off from element 32. Element 32 can then be rotated by means of a spanner wrench, for the purpose of rotating the body 40 and the upper end of the spring 62. Torque is thus applied to the spring, for the purpose of adjusting the spring tension to a selected extent. When the spring tension has been adjusted as necessary, the nut 60 is advanced toward the element 32, so as to bind said element against the upper anchor plate, thereby to lock the several parts against relative rotation.

Apart from the above, there is a second functional characteristic of importance. This resides in the use of the cushioning ring 26 and cushion pad 76. Ring 26, as will be noted from Figure 2, surrounds the upper end of the spring, and is disposed exteriorly of the spring. Pad 76, on the other hand, is disposed interiorly of the large end of the spring.

Should the spring be compressed to an excessive extent, the overlapped convolutions thereof will be engaged by the cushioning ring 26 and pad 76 respectively. Ring 26 will, of course, engage the upper edges of the axially compressed convolutions, while pad 76 will engage the lower edges thereof.

It has been found that this will produce a highly desirable spring action, and at the same time, the particular formation and relative arrangement of spring 62 and the cushioning means 26, 76, will be effective to impart a highly effective shock-absorbing action to the spring, making separate shock absorbers unnecessary.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A shock-absorbent spring assembly comprising spaced anchor plates; a volute spring having a fixed connection at one end to one of said plates; means having a fixed connection to the other end of said spring and rotatably mounted on the other plate for applying torque to said other end of the spring for adjusting the tension thereof; and a toothed element carried by said means, said other plate having teeth engaging said element in selected positions to which said means is rotatably adjusted, for locking said means against movement from said positions.

2. A shock-absorbent spring assembly comprising spaced anchor plates; a volute spring having a fixed connection at one end to one of said plates; means having a fixed connection to the other end of said spring and mounted upon the other plate for rotation about an axis aligned with that of the spring, for applying torque to the spring to adjust the tension thereof; and a toothed element carried by said means, said other plate having teeth engaging said toothed element in selected positions to which said means is rotatably adjusted, for locking said means against movement from each of said positions.

3. A shock-absorbent spring assembly comprising spaced anchor plates; a volute spring having a fixed connection at one end to one of said plates; a plug-like body having a fixed connection to the other end of said spring and mounted upon the other plate to rotate about an axis aligned with that of the spring, for applying torque to the spring to adjust the tension thereof; and a toothed element carried by said body, said other plate having teeth engaging said toothed element in selected positions to which said body is rotatably adjusted, for locking said body against movement from each of said positions.

4. A shock-absorbent spring assembly comprising spaced anchor plates; a volute spring having a fixed connection at one end to one of said plates; a plug-like body having a fixed connection to the other end of said spring and mounted upon the other plate to rotate about an axis aligned with that of the spring, for applying torque to the spring to adjust the tension thereof, said body including an axial extension of non-circular cross section; and a toothed element having a non-circular opening receiving said extension, said other plate having teeth engaging said toothed element in selected positions to which the body is rotatably adjusted, for locking the body against movement from each of said positions.

5. A shock-absorbent spring assembly comprising spaced anchor plates; a volute spring formed from a length of flat bar material and having overlapped convolutions, said spring having a fixed connection at one end to one of said plates; a plug-like body extending into and having a fixed conection to the other end of said spring and mounted upon the other plate to rotate about an axis aligned with that of the spring, for applying torque to the spring to adjust the tension thereof, said body including an axial extension of non-circular cross section and a threaded portion adjacent said extension; a toothed element having a non-circular opening receiving said extension, said element sliding on the extension toward and away from said other plate and having wrench-receiving means on its periphery for rotation of said element and body jointly; and a lock nut engaged with said threaded portion to shift the element into locking engagement with said other plate, said other plate having teeth engaging said toothed element in selected positions to which the body and element are rotatably adjusted, thereby to lock the body against movement from each of said positions.

References Cited in the file of this patent

UNITED STATES PATENTS

| | | |
|---|---|---|
| 1,539,272 | Prescott | May 26, 1925 |
| 2,000,905 | Rockefeller | May 14, 1935 |